Patented Nov. 21, 1933

1,936,152

UNITED STATES PATENT OFFICE 1,936,152

PASTE

Oscar H. Bahr, Kohler, Wis.

No Drawing. Application January 4, 1932
Serial No. 584,760

6 Claims. (Cl. 87—17)

The object of my invention is the production of a paste for use as an adhesive which is superior for some purposes to any paste now upon the market. Pastes composed of various vegetable starches and water have long been known and used with more or less satisfactory results. Such pastes have the advantage of cheapness of material as well as satisfactory adhesive qualities. However, a disadvantage of these pastes is their liability to ferment upon exposure and, to a certain degree, during the drying after application.

This fermentation is not only objectionable by reason of destroying or weakening the adhesive qualities of the paste, but results in the formation of organic acids. These organic acids are harmful to certain surfaces upon which it is desirable to use the paste. For example, some enameled surfaces are quite sensitive to acid. The use of starch pastes upon such surfaces usually results in the organic acids attacking the enamel and destroying the gloss, causing a noticeable discoloration or roughening of the enameled surface.

I have discovered that fermentation of this type of paste may be inhibited by the addition of a suitable amount of zinc oxide. The zinc oxide acts as a fermentation preventive. It also doubtless serves to neutralize any organic acids which are initially present or might be formed in the paste. The action of the zinc oxide is sufficiently efficient so that samples of paste containing zinc oxide have been allowed to stand in the open for over a month without evidence of fermentation, while samples not containing the zinc oxide became unfit for any use in a short time under the same conditions.

The proportions of the zinc oxide may vary considerably, depending upon the purpose for which the paste is to be used, the degree to which it is desirable to prevent fermentation, and the adhesiveness desired; it being understood that the effectiveness of the zinc oxide as a fermentation preventive is increased as its proportion is increased, while the adhesiveness of the paste is correspondingly decreased. I, therefore, use as much zinc oxide as is possible without impairing the adhesiveness necessary for the purpose used. The base of the paste may be any vegetable starch having the necessary adhesive qualities, for example, corn flour or wheat flour, both of which give satisfactory results. I have found as little as one part of zinc oxide to ten parts of paste to be effective in preventing fermentation, while it is possible to use as much as two parts of zinc oxide to one part of paste where it is not essential that the paste have great adhesive power.

In preparing the composition for a purpose such as attaching labels, stickers or similar uses, I prefer to use a mixture in about the following proportions: 5 parts of vegetable starch, preferably corn or wheat flour starch, to 1 part of zinc oxide. These ingredients are mixed in any suitable manner, such as in a ball mill. They may be mixed either dry or in paste form, enough cold water being added to bring the paste to the consistency desired for use.

In some cases it is desirable to use a paste which has not a great degree of adhesive power but which is harmless to enameled surfaces. For example, enameled fixtures, such as the bath tub, are usually installed in buildings before plastering, painting and the finishing operations are conducted. It is desirable to protect the enameled surface from being scratched or damaged during these later operations, and one favorite method is to paste paper over all the enameled surfaces. The paste for this purpose need not have great adhesive power, in fact it will be found advantageous to have a paste with a rather low adhesive power to facilitate the removal of the paper when desired. It is desirable, therefore, to use a paste which does not dry hard, as do starch pastes, thereby rendering the removal of the paper and adhering paste an easier task.

For this purpose I prefer to add a clay to the above formula. Many types of clay may be used for this purpose, such as, for example, kaolin or china clay. The addition of a suitable amount of clay to a starch paste causes it to dry soft and somewhat flocculent, allowing the substance attached thereby or the residuum of paste to be readily removed. The proportion of clay used may vary within wide limits, depending upon the adhesiveness desired, it being understood that the clay is, as far as adhesiveness is concerned, practically an inert material.

A formula which I have found suitable for the purpose of attaching a covering for the protection of enameled surfaces as described above is twenty-seven parts of clay, six and one-half parts of zinc oxide, and six and one-half parts of vegetable starch, preferably corn or wheat flour.

For some purposes I prefer to substitute all or a portion of the clay in the above formula with the substance known as bentonite.

This paste may be made up, mixed and prepared for use as described above, or in any other suitable manner. It will be found that this paste is absolutely harmless to enameled surfaces, and that the covering attached by means of this paste, as well as the residuum of paste, is easily removed, as it dries soft, is somewhat flocculent in texture, and does not harden excessively as does a pure starch paste.

It will be understood that in case the preventation of fermentation is not important, as, where the paste is to be used as soon as mixed with water and is to be used upon surfaces not affected by organic acids, the zinc oxide may be omitted and a mixture of paste and clay used.

While I have described the proportions which I now believe to be best, it will be understood that other proportions may be found suitable for certain uses; therefore, I do not wish to limit myself to the exact proportions mentioned, but claim all compositions within the spirit of my invention and the scope of the appended claims.

I claim:

1. An adhesive comprising ten parts vegetable starch and a fermentation preventive consisting of one to twenty parts of zinc oxide.

2. An adhesive comprising twenty-seven parts of clay, six and one-half parts of zinc oxide, and six and one-half parts vegetable starch.

3. The method of protecting enameled surfaces comprising covering said surfaces with paper attached thereto by an adhesive starch paste, said paste containing a fermentation preventive to inhibit the formation of organic acids.

4. The method of protecting enameled surfaces comprising covering said surfaces with paper attached thereto by an adhesive starch paste, said paste containing zinc oxide to inhibit the formation of organic acids.

5. The method of protecting enameled surfaces during construction work and the like comprising covering said surfaces with paper attached thereto by an adhesive starch paste containing zinc oxide and clay.

6. An adhesive comprising vegetable starch having added thereto zinc oxide as a fermentation preventive and clay as a softening agent.

OSCAR H. BAHR.